United States Patent
Sieber et al.

(10) Patent No.: US 9,529,367 B2
(45) Date of Patent: Dec. 27, 2016

(54) METHOD AND CONTROL UNIT FOR CONTROLLING A HAPTIC ACCELERATOR PEDAL OF A MOTOR VEHICLE WITH AN ACTIVATION CONDITION, AND COMPUTER PROGRAM PRODUCT FOR CARRYING OUT THE METHOD AND COMPUTER-READABLE MEDIUM THEREFOR

(71) Applicant: Robert Bosch GmbH, Stuttgart (DE)

(72) Inventors: Udo Sieber, Bietigheim (DE); Markus Deissler, Neckarsulm (DE); Daniel Henning, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 14/405,886

(22) PCT Filed: Apr. 15, 2013

(86) PCT No.: PCT/EP2013/057845
§ 371 (c)(1),
(2) Date: Dec. 5, 2014

(87) PCT Pub. No.: WO2013/182339
PCT Pub. Date: Dec. 12, 2013

(65) Prior Publication Data
US 2015/0127236 A1    May 7, 2015

(30) Foreign Application Priority Data
Jun. 8, 2012  (DE) .......................... 10 2012 209 647

(51) Int. Cl.
G06F 7/70    (2006.01)
G06F 19/00   (2011.01)
(Continued)

(52) U.S. Cl.
CPC .............. *G05D 13/62* (2013.01); *B60K 26/021* (2013.01); *B60W 50/16* (2013.01); *G05D 13/02* (2013.01);
(Continued)

(58) Field of Classification Search
CPC ...... B60W 50/16; B60K 26/021; G05D 13/62; G05D 13/02
(Continued)

(56) References Cited

FOREIGN PATENT DOCUMENTS

DE    25 55 429 A     6/1977
DE    102 50 456 A1   2/2004
(Continued)

OTHER PUBLICATIONS

International Search Report corresponding to PCT Application No. PCT/EP2013/057845, mailed Aug. 29, 2013 (German and English language document) (7 pages).

*Primary Examiner* — Maceeh Anwari
(74) *Attorney, Agent, or Firm* — Maginot, Moore & Beck LLP

(57) ABSTRACT

A method for controlling a haptic accelerator pedal in a motor vehicle includes determining a current rate of change of the pedal at which a pedal lever of the pedal changes its position between a first position of rest and a second position of maximum activation when the pedal lever is moved in an activation direction. The determined current rate of change of the pedal is compared with a predefined limiting value for the rate of change of the pedal. The actuator is activated if the determined current rate of change of the pedal is lower than the limiting value for the rate of change of the pedal. The pedal is excited by means of the actuator by applying an opposing force counter to the activation direction to generate a haptically perceptible signal if the actuator is activated when an activation condition occurs.

10 Claims, 2 Drawing Sheets

(51) Int. Cl.
    *G06G 7/00*     (2006.01)
    *G06G 7/76*     (2006.01)
    *G05D 13/62*    (2006.01)
    *B60W 50/16*    (2012.01)
    *B60K 26/02*    (2006.01)
    *G05D 13/02*    (2006.01)

(52) U.S. Cl.
    CPC .... *B60K 2026/022* (2013.01); *B60K 2026/023* (2013.01); *B60W 2540/106* (2013.01)

(58) Field of Classification Search
    USPC .......................................................... 701/70
    See application file for complete search history.

(56) References Cited

FOREIGN PATENT DOCUMENTS

| | | |
|---|---|---|
| DE | 10 2004 029 371 A1 | 1/2006 |
| DE | 10 2009 045 512 A1 | 4/2011 |
| EP | 2 546 496 A1 | 1/2013 |
| JP | 2005-132225 A | 5/2005 |
| JP | 2007-26218 A | 2/2007 |
| JP | 2010-235088 A | 10/2010 |

METHOD AND CONTROL UNIT FOR CONTROLLING A HAPTIC ACCELERATOR PEDAL OF A MOTOR VEHICLE WITH AN ACTIVATION CONDITION, AND COMPUTER PROGRAM PRODUCT FOR CARRYING OUT THE METHOD AND COMPUTER-READABLE MEDIUM THEREFOR

This application is a 35 U.S.C. §371 National Stage Application of PCT/EP2013/057845, filed on Apr. 15, 2013, which claims the benefit of priority to Serial No. DE 10 2012 209 647.7, filed on Jun. 8, 2012 in Germany, the disclosures of which are incorporated herein by reference in their entirety.

The present disclosure relates to a method and to a control unit for controlling a haptic accelerator pedal in a motor vehicle. The disclosure also relates to a computer program product which, when it is executed on a programmable control unit, is to execute the method according to the disclosure, and to a computer-readable medium on which such a computer program product is stored.

BACKGROUND

In modern motor vehicles, the driver is supported, as he drives the vehicle, by a multiplicity of information items which are made available. For example, it may be helpful to signal to the driver feedback about specific driving states or requests to the driver to take certain measures, in order to be able to increase the safety when driving or the driver's comfort or in order to be able to save fuel. This feedback can be made available in different ways, such as for example optically or acoustically.

In modern motor vehicles, possibilities for haptic feedback to the driver are often additionally also implemented by means of the accelerator pedal of the vehicle. The accelerator pedal is for this purpose equipped with an actuator which makes it possible to apply a force selectively to a pedal lever, to be activated by the driver, of the accelerator pedal.

For example, starting from a certain pedal lever position the actuator can selectively counteract further depression of the pedal lever in order therefore to signal to a driver, for example, that depressing the pedal lever more strongly would bring about a disproportionate increase in the fuel consumption.

Alternatively, the actuator can be used to apply a force to the pedal lever which varies over time, in order to cause said lever to experience oscillations, for example in the form of vibrations or pulsations.

In this way, instructions and warnings can be communicated to the driver through the driver's haptic perception, or else comfort functions can be made available without the driver being distracted, for example, from observing the traffic by optical or acoustic signals.

DE 25 55 429 describes a system for generating tactile or haptically perceptible signals in vehicle.

SUMMARY

The present disclosure permits, in its embodiments, advantageous actuation of a haptic accelerator pedal in a motor vehicle. In particular, the disclosure can control activation of the actuator of the accelerator pedal in such a way that, for example, influences of the actuator on the accelerator pedal, which can be perceived by a driver as disruptive, can be avoided or kept small or superfluous activations of the actuator can be avoided.

In the method proposed here for controlling a haptic accelerator pedal, it is assumed that a pedal lever of the accelerator pedal can be moved in an activation direction within a movement range between a position of rest and a position of maximum activation. The pedal lever is to be able to generate a haptically perceptible signal by means of an actuator by applying an opposing force counter to the activation direction, if the actuator is activated when an activation condition occurs. In a non-activated state, the actuator can in this context not be in mechanical contact with the pedal lever under certain circumstances, wherein when the actuator is activated it can be brought into mechanical contact with the pedal lever. The proposed method is intended here to comprise the following steps: A current rate of change of the pedal, that is to say a rate at which the pedal lever changes its position is to be determined, and subsequently the determined current rate of change of the pedal is to be compared with a predefined limiting value for the rate of change of the pedal, in order finally to activate the actuator only if the determined current rate of change of the pedal is lower than the limiting value for the rate of change of the pedal.

Motivations and ideas on which the method according to the disclosure is based can be considered to be, inter alia, the fact that an actuator of a haptic accelerator pedal is to be actuated as far as possible in such a way that, on the one hand, a haptically perceptible signal can be helpful to the driver, and should be generated, only if, within the scope of the technical possibilities, the haptic signal can be generated in sufficiently good time so that the driver can react appropriately to the haptic signal. On the other hand, a haptically perceptible signal should also be generated only in situations in which it can be assumed that the driver desires information to be correspondingly made available.

It has been recognized that a currently determined rate of change of the pedal constitutes a suitable parameter to be monitored for the satisfaction of one of the two conditions specified.

For example, a functionality which is frequently implemented using a haptic accelerator pedal can comprise selecting the activation condition at the occurrence of which the haptic accelerator pedal is activated by means of its actuator in order to generate a haptically perceptible signal, in such a way that a haptically perceptible signal is generated by the actuator on the pedal lever if a further depression of the pedal lever would bring about a considerably disproportionate increase in fuel consumption. In this way during the pressing down of the pedal lever it is possible to signal to the driver, for example, a limit for operation which is favorable for consumption. This can be implemented generally in the form of a variable pressure point for the accelerator pedal. For this purpose, the actuator which is integrated into the accelerator pedal usually conducts an additional opposing force onto the pedal lever just before the limiting position is assumed. This opposing force then increases until the limiting position is reached. When the limiting position is exceeded, this opposing force usually decreases again over a suitably short pedal travel.

Haptically perceptible signals can also be transmitted to the driver in order to communicate warnings or messages. As an alternative to generating a variable pressure point the haptically perceptible signal can also be transmitted to the driver in the form of vibrations or pulsations.

In order actually to generate the pressure point or the vibrations or pulsations at the desired limiting position in this context, irrespective of the pressing speed at which the driver presses down the accelerator pedal, the actuator should be able to apply its force to the pedal within a very short time of, for example, several milliseconds.

However, there may be haptic accelerator pedals in which owing to an actuator's technical properties or owing to the way in which it is actuated, an actuator requires a certain actuation time to couple itself to the pedal lever and then be able to apply an opposing force to the pedal lever. For example, in a large number of haptic accelerator pedals there is provision that during time periods in which a haptically perceptible signal is not to be generated, the actuator is moved into a parked position or intermediate position in which the actuator is not in mechanical contact with the pedal lever, and is preferably even arranged completely outside the movement range of the pedal lever, in order to prevent undesired influencing of the behavior of the pedal lever which is disruptive for the driver. In such a case, an actuation time of, for example, 50 to 100 ms may be required in order to place the actuator in contact with the pedal lever.

However, if a driver presses the pedal lever down very quickly in the direction of its position of maximum activation, there can be situations in which, even at the maximum possible movement speed, the actuator would enter into contact with the pedal lever too late for a haptically perceptible signal at a suitable position of the pedal to be able to be generated in good time to the driver. If such a rapid depression of the pedal lever is detected, it can be therefore assumed that it is not possible to generate a haptically perceptible signal in good time, in response to which the generation of the haptically perceptible signal is preferably dispensed with.

On the other hand, there can be situations in which a driver presses the pedal lever quickly downward and with maximum effort in order to bring about maximum acceleration for the vehicle, for example when overtaking at a location with poor visibility or when there is already visible oncoming traffic. In such a situation, haptically perceptible signals which signal operation of the vehicle which is favorable for consumption are neither sensible nor desired by the driver.

In both described situations, that is to say in the case of limited actuator dynamics up to the coupling of the actuator to the pedal lever, on the one hand, or in the case of a definite acceleration request of the driver, on the other, a rate of change of the pedal which is to be monitored constitutes a suitable parameter on the basis of which it can be decided whether in the present situation the generation of a haptically perceptible signal is, on the one hand, technically possible and capable of being generated in good time and, on the other hand, is appropriate and desired by the driver.

It is also possible to provide that in the event of the actuator having already been activated, the actuator is moved into a parked position outside the movement travel of the pedal lever if it is detected that the current rate of change of the pedal is higher than the limiting value for the rate of change of the pedal.

A current position of the pedal lever can be determined here, for example, using a pedal lever position sensor. The current rate $d\alpha/dt$ of change of the pedal can then be determined from a rate of change of a signal which is output by the pedal lever position sensor and which specifies, for example, the angle $\alpha$ at which the pedal lever is currently oriented. The pedal lever position sensor can be implemented technically here in different ways, for example as a potentiometer which is coupled to the pedal lever.

The limiting value for the rate of change of the pedal in the simplest configuration can be a value which is permanently preset. In this case, whenever it is detected that a position of the pedal lever changes more quickly than is specified by the limiting value for the rate of change of the pedal, activation of the actuator despite the satisfaction of an activation condition is also suppressed. The current configuration in which the components of the haptic accelerator pedal are to be found is not taken into account in this case.

Alternatively, the limiting value for the rate of change of the pedal can be selected as a function of the current position of the pedal lever. Alternatively or additionally, the limiting value for the rate of change of the pedal can be selected as a function of the current position of the actuator. It is therefore possible to take into account, for example, that the movement travel which the actuator has to undergo before it enters into mechanical contact with the pedal lever can be dependent on the current position of the pedal lever and/or the current position of the actuator.

In particular, the closer the current position of the pedal to the position of maximum activation of the pedal lever, the lower the value which can be selected for the limiting value for the rate of change of the pedal. This makes it possible to take into account the fact that, on the one hand, when the pedal lever is already partially depressed the probability increases that the actuator can no longer be placed into mechanical contact with the pedal lever in good time before the pedal lever reaches the position of the pedal at which the haptically perceptible signal is actually to be generated, and that, on the other hand, the probability increases that in the event of further relatively rapid pressing down of the pedal lever starting from the already partially pressed-down position of the pedal lever it is possible to assume a request by the driver for strong acceleration, and it is therefore possible to refrain from generating a haptically perceptible signal.

The limiting value for the rate of change of the pedal can be stored, for example, in an electrically readable memory, with the result that said limiting value can be read out by a control unit which controls the haptic accelerator pedal. As described above, the limiting value for the rate of change of the pedal can be stored, for example, as an individual, permanently preset value or as a list or table of limiting values as a function of a current position of the pedal lever and/or of the actuator. A dynamic change in the limiting value for the rate of change of the pedal owing, for example, to a learning process by the control unit is also conceivable. Typical values for the limiting value for the rate of change of the pedal are in the range of a rate of change of the angle of the pedal lever of more than 100°/s, preferably more than 200°/s.

The embodiments of inventive methods described above and the functionalities and advantages which can be achieved therewith can be implemented by a control unit, provided in a vehicle, for controlling the accelerator pedal.

The control unit can be configured here to be able to receive, for example, signals from a pedal lever position sensor and to be able to transmit control signals to the actuator of the accelerator pedal via suitable interfaces. The generally used term "control unit" is not to be understood here as excluding the possibility that not only open-loop control but also active closed-loop control of the actuator can be carried out.

The control unit can implement the proposed control method and any information evaluations of sensor signals by means of hardware and/or software. It can be advantageous to program a programmable control unit for the execution of the method described above. For this purpose, a computer program product can have computer-readable instructions which instruct the programmable control unit to carry out the steps of the respective method. The computer program product can be stored on a computer-readable medium such as, for example, a CD a DVD, a flash memory, a ROM and an EPROM or the like. In order to be able to actuate correctly the arrangement which is to be assumed by the actuator, it is possible to use not only the processing of further sensor data but also information which is stored in a database or in the form of characteristic curves and which relates to a reaction behavior carried out by the actuator, to specific control signals or a route behavior of the actuator.

It is noted that possible features and advantages of embodiments of the disclosure are described herein partially with reference to a method according to the disclosure and partially with reference to a control unit according to the disclosure. A person skilled in the art would recognize that the individual features can be suitably combined with one another or exchanged, in particular can be transferred from the control unit to the method, and vice versa, in order to be able to arrive in this way at further embodiments and possibly synergy effects.

BRIEF DESCRIPTION OF THE DRAWINGS

Embodiments of the disclosure are described below with reference to the appended drawings. Neither the description nor the drawings are to be interpreted here as limiting the disclosure.

The figures are merely schematic and are not true to scale.

DETAILED DESCRIPTION

Figure 1:
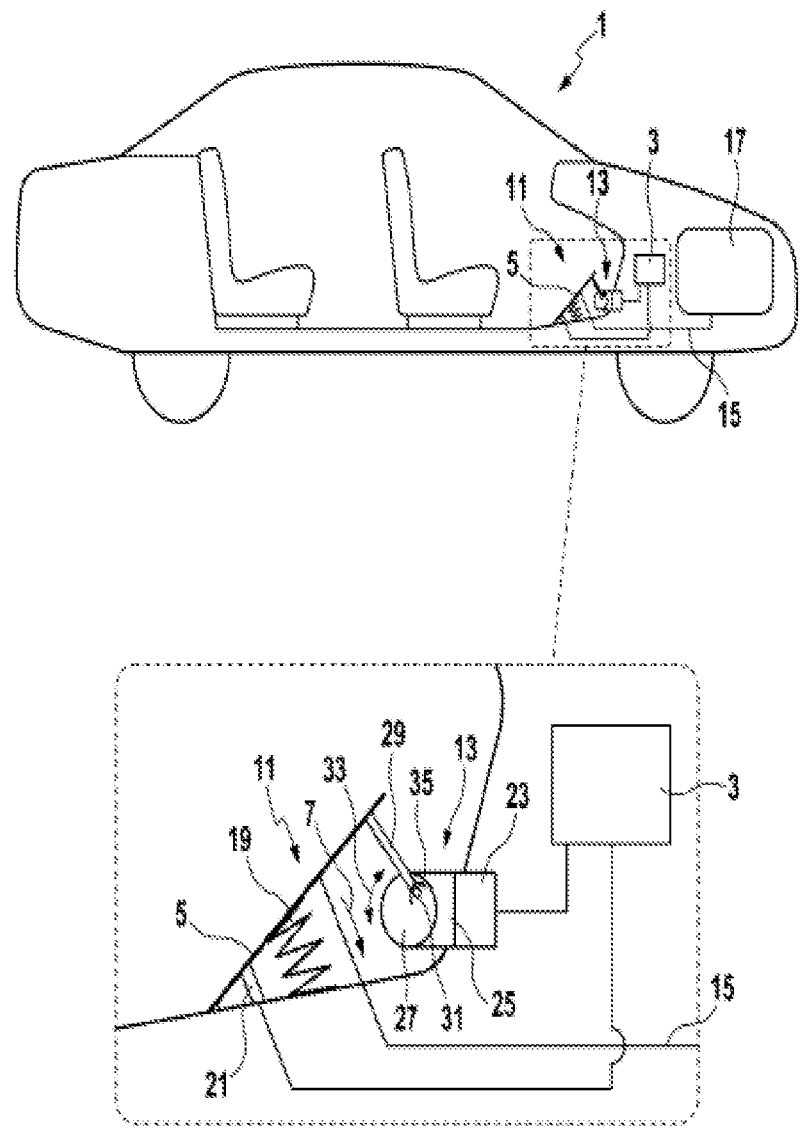
FIG. 1 shows a motor vehicle with a control unit for executing a method according to an embodiment of the present disclosure.

FIG. 1 shows a sectional view of a vehicle 1 with a haptic accelerator pedal 11. By depressing the pedal lever 5, a driver can cause an engine 17 of the vehicle to bring about acceleration of the vehicle, via a Bowden cable 15 or a line (not illustrated) which is connected to an engine control unit. For this purpose, the driver has to depress the pedal lever 5 in an activation direction of the arrow 7, as a result of which the pedal lever 5 can be moved from a position of rest along a movement range up to a position of maximum activation. A pedal lever position sensor 21 can in this context determine the current position or the position of the pedal lever 5. A spring 19 prestresses the pedal lever 5 toward the position of rest counter to the activation direction 7.

The accelerator pedal 11 is configured as a haptic accelerator pedal. For this purpose, the accelerator pedal 11 has an actuator 13 which can be used to move the pedal lever 5 in a desired direction counter to the activation direction 7 or to apply force thereto. In this context the actuator 13 can excite the pedal lever 5 to experience oscillations, for example in the form of vibrations or pulsations. Alternatively, the actuator 13 can apply a force to the pedal lever 5 which force can make further depression of the pedal lever 5 more difficult and therefore can be perceived by a driver as a pressure point during the activation of the pedal lever 5.

The actuator 13 can be operated with a motor 23 which is coupled to an activation disk 27 via a transmission 25. By activating the motor 23, the activation disk 27 can be rotated in or counter to the clockwise direction, as indicated by the arrow 33. A cam 31 is provided on the activation disk 27 in an off-center region. This cam 31 can interact with a tappet 29 which is provided on the pedal lever 5. For this purpose, the tappet 29 has, at its ends directed to the actuator 13, a fork-shaped receptacle 35 into which the cam 31 can engage as soon as the activation disk 27 has been rotated into a corresponding position.

Alternatively, the actuator can also be configured as a direct drive, for example with a torque motor, as a result of which high forces can also be generated without a transmission.

The actuator 13 is actuated by a control unit 3. The control unit 3 detects when a haptically perceptible signal is to be transmitted to a driver via the pedal lever 5, in order to inform the driver, for example, of the possibility of a fuel-saving driving style or of a hazardous situation. The control unit subsequently activates the actuator and activates the latter in such a way that a constant force or a force which varies over time is applied to the pedal lever 5 counter to the activation direction 7.

As long as a haptically perceptible signal is not to be applied to the pedal lever 5, i.e. in the non-activated state, the actuator 13 should remain in a position in which it does not influence a movement of the pedal lever 5 in order to avoid undesired interference influences on the behavior of the pedal lever 5. For this purpose, the actuator can be moved, for example, into a position, with the result that the cam 31 lies outside the movement range of the fork 35 which is coupled to the pedal lever 5.

Figure 2:
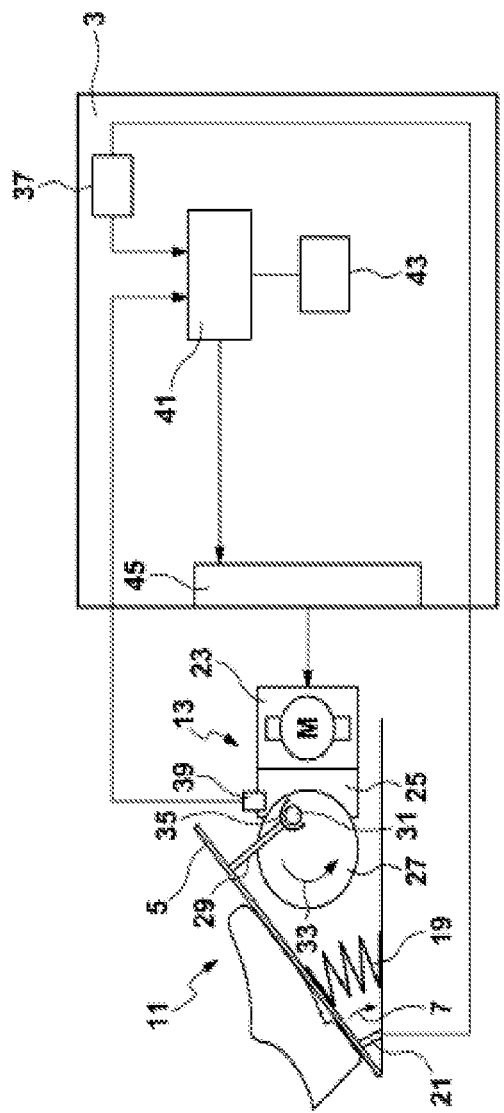
FIG. 2 shows a haptic accelerator pedal with a control unit according to an embodiment of the present disclosure.

FIG. 2 illustrates an embodiment of an accelerator pedal 11 and of the control unit 3 which is used to actuate the latter, in order to actuate the accelerator pedal 11 in accordance with the method according to the disclosure. The pedal lever position sensor 21 continuously monitors a current position of the pedal lever 5. As in conventional haptic accelerator pedals, signals of the pedal lever position sensor 21 can be used to actuate the actuator 13 in order to move it into a position of rest, for example during periods of time in which no haptically perceptible signal is to be generated, or to move it in periods of time in which a haptically perceptible signal is to be generated, in such a way that the cam 31 comes into mechanical abutment with the fork 35. Control components which are provided for this purpose are not illustrated in FIG. 2 for reasons of clarity.

In addition, the signal which is output by the pedal lever position sensor 21 is now transmitted to an evaluation unit 37 in the control unit 3, which evaluation unit 37 observes the time profile of this signal and generates therefrom a signal which indicates a rate of change of the pedal, that is to say which indicates how quickly the position of the pedal lever 5 changes, for example, in reaction to a force which is applied thereto by the driver. The corresponding signal is passed on to a comparison unit 41. In this comparison unit 41, this signal for the rate of change of the pedal is compared with a limiting value for the rate of change of the pedal which is stored in a memory 43. A signal is transmitted to an output stage 45 only if the actual signal for the rate of change of the pedal is lower than the predefined limiting value for the rate of change of the pedal. Insofar as a signal which indicates that an activation condition is satisfied is sent, for example, from a further control circuit (not illustrated in FIG. 2) to the output stage 45, the output stage 45 actuates the actuator 13 in such a way that the cam 31 moves into mechanical contact with the fork 35 of the tappet 29 which is provided on the pedal lever 5, and a haptically perceptible signal is generated.

As an example it can be assumed that a driver can completely depress the pedal lever 5 within approximately 80 ms. Assuming a movement range of the pedal lever of approximately 17°, this means a rate of change of the pedal of approximately 200°/s. This value or this value with a certain supplement can now be defined as a limiting value, and the correspondingly actuated system therefore decides, given a rate of change of the pedal of more than 200°/s, that a haptically perceptible signal is not appropriate and therefore is not to be generated, despite the activation condition being satisfied, that is to say, for example, despite a large increase in the consumption of fuel when the pedal lever is pressed down further.

In addition, the signal from an actuator position sensor 39 can also be used in the comparison unit 41 in order to also be able to be taken into account in the decision as to whether or not a haptically perceptible signal is to be generated. In this context, maximum possible actuator dynamics for various actuation starting conditions of the actuator can be stored in the system, wherein it is then possible to calculate and/or decide on the basis of the current rate of change of the pedal whether the actuator 13 can reach the pedal lever 5 at the predefined position, and whether it is possible to generate a haptically perceptible signal in good time.

The invention claimed is:

1. A method for controlling a haptic accelerator pedal in a motor vehicle comprising:
    determining a current rate of change of a position of a pedal lever of the haptic accelerator pedal when the pedal lever is moved in an activation direction, the activation direction being a direction that causes an acceleration of the motor vehicle;
    detecting if an activation condition occurs;
    comparing the determined current rate of change of the pedal lever with a predefined limiting value for the rate of change of the pedal lever; and
    activating an actuator of the haptic accelerator pedal only if (i) the activation condition is detected and (ii) the determined current rate of change of the pedal lever is lower than the predefined limiting value for the rate of change of the pedal,
    operating the actuator to apply an opposing force counter to the activation direction to generate a haptically perceptible signal if the actuator is activated,
    wherein the predefined limiting value for the rate of change of the pedal lever is dependent on at least one of (i) the current position of the pedal lever and (ii) a position of the actuator.

2. The method as claimed in claim 1, further comprising:
    determining a current position of the pedal lever with a pedal lever position sensor; and
    determining the current rate of change of the pedal lever from a rate of change of a signal output by the pedal lever position sensor.

3. The method as claimed in claim 1, wherein the predefined limiting value for the rate of change of the pedal is lower the closer the current position of the pedal lever is to a maximum activation position.

4. The method as claimed in claim 1, further comprising:
    operating the actuator to (i) while activated, mechanically engage with the pedal lever, and (ii) while not activated, move to a parked position that is mechanically disengaged from the pedal lever.

5. The method as claimed in claim 1, wherein the activation condition occurs if at least one of:
    a further change of the position of the pedal lever in the activation direction will result in a considerably disproportionate increase in the fuel consumption; and
    at least one of a warning and a message is to be transmitted to a driver.

6. The method as claimed in claim 1, further comprising:
    operating the actuator to move to a parked position that is mechanically disengaged from the pedal lever if the determined current rate of change of the pedal lever is higher than the predefined limiting value for the rate of change of the pedal.

7. The method as claimed in claim 1, wherein the predefined limiting value for the rate of change of the pedal lever is stored in an electrically readable memory.

8. The method as claimed in claim 1, wherein the predefined limiting value for the rate of change of the pedal lever is higher than 100°/s.

9. A control unit for controlling a haptic accelerator pedal in a motor vehicle, comprising:
    an evaluation unit configured to receive a first signal from a pedal lever position sensor, determine a current rate of change of a position of a pedal lever of the haptic accelerator pedal when the pedal lever is moved in an activation direction, the activation direction being a direction that causes an acceleration of the motor vehicle, and provide a second signal indicating the current rate of change of the pedal lever;
    a detection unit configured to detect if an activation condition occurs;
    a comparison unit connected to the evaluation unit and configured to receive the second signal and compare the current rate of change of the pedal lever with a predefined limiting value for rate of change of the pedal lever;
    a memory connected to the comparison unit configured to store the limiting value;
    an output stage device connected to the comparison unit and the detection unit and configured to activate an actuator of the haptic accelerator pedal only if (i) the activation condition is detected and (ii) the determined current rate of change of the pedal lever is lower than the predefined limiting value for the rate of change of the pedal lever, the output stage device being configured to operate the actuator to apply an opposing force counter to the activation direction to generate a haptically perceptible signal if the actuator is activated,
    wherein the predefined limiting value for the rate of change of the pedal lever is dependent on at least one of (i) the current position of the pedal lever and (ii) a position of the actuator.

10. A non-transitory computer program product having computer-readable instructions which, when executed by a programmable control unit instruct the programmable control unit to carry out a method comprising:
    determining a current rate of change of a position of a pedal lever of the haptic accelerator pedal when the pedal lever is moved in an activation direction, the activation direction being a direction that causes an acceleration of the motor vehicle;
    detecting if an activation condition occurs;
    comparing the determined current rate of change of the pedal lever with a predefined limiting value for the rate of change of the pedal lever; and
    activating an actuator of the haptic accelerator pedal only if (i) the activation condition is detected and (ii) the determined current rate of change of the pedal lever is lower than the predefined limiting value for the rate of change of the pedal lever; and operating the actuator to apply an opposing force counter to the activation direction to generate a haptically perceptible signal if the actuator is activated,
wherein the predefined limiting value for the rate of change of the pedal lever is dependent on at least one of (i) the current position of the pedal lever and (ii) a position of the actuator.

\* \* \* \* \*